Figure 1:
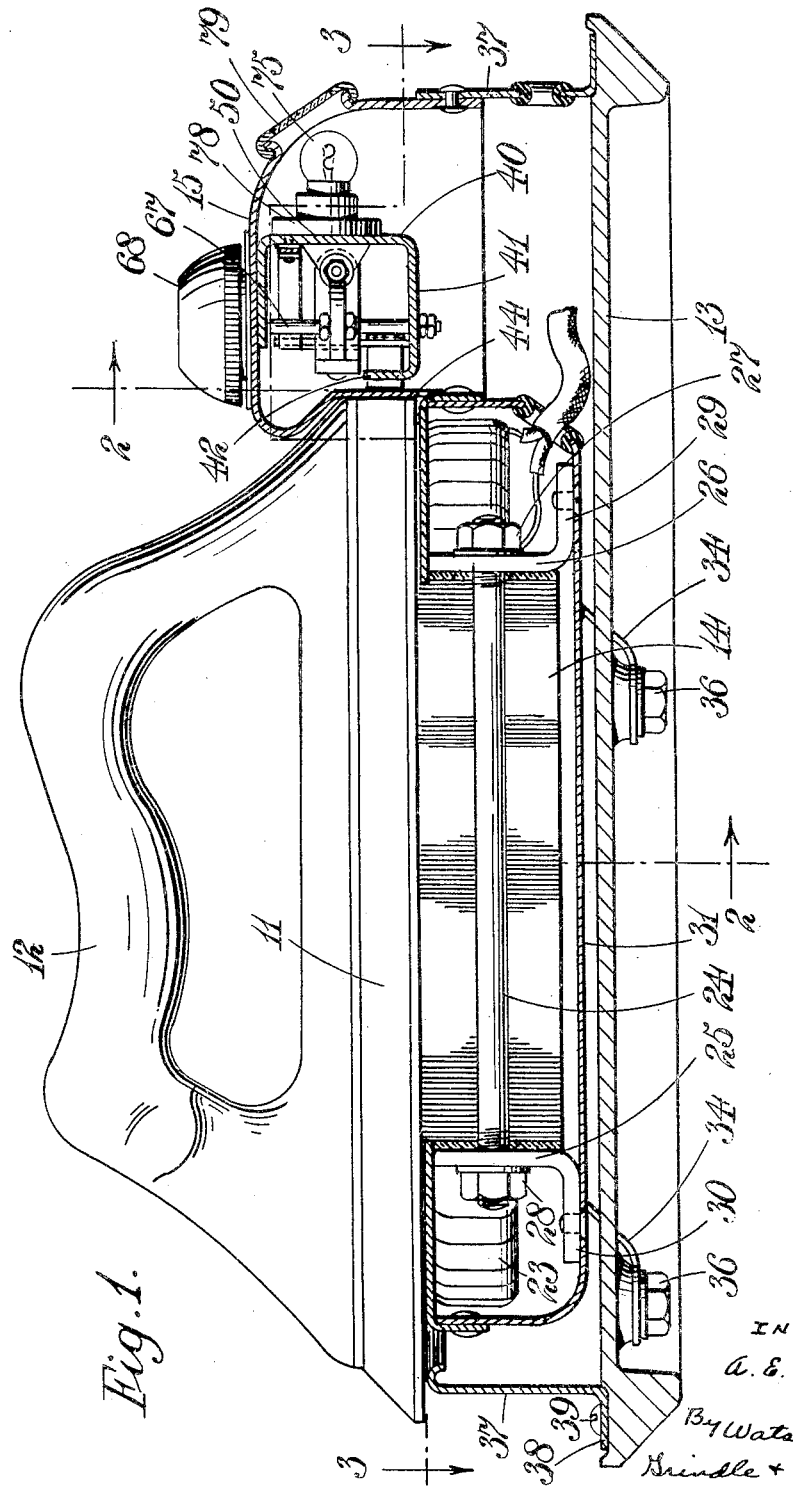

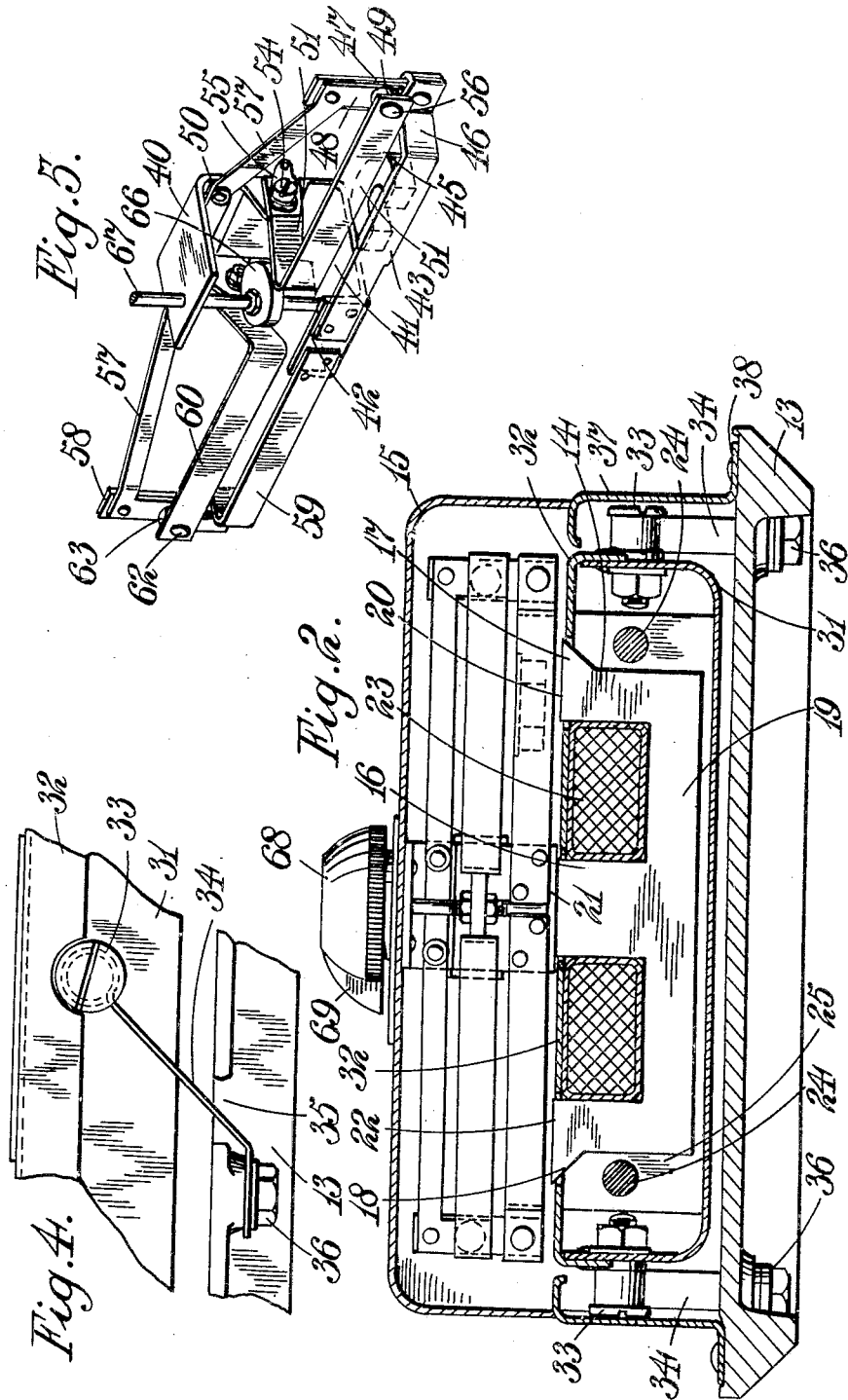

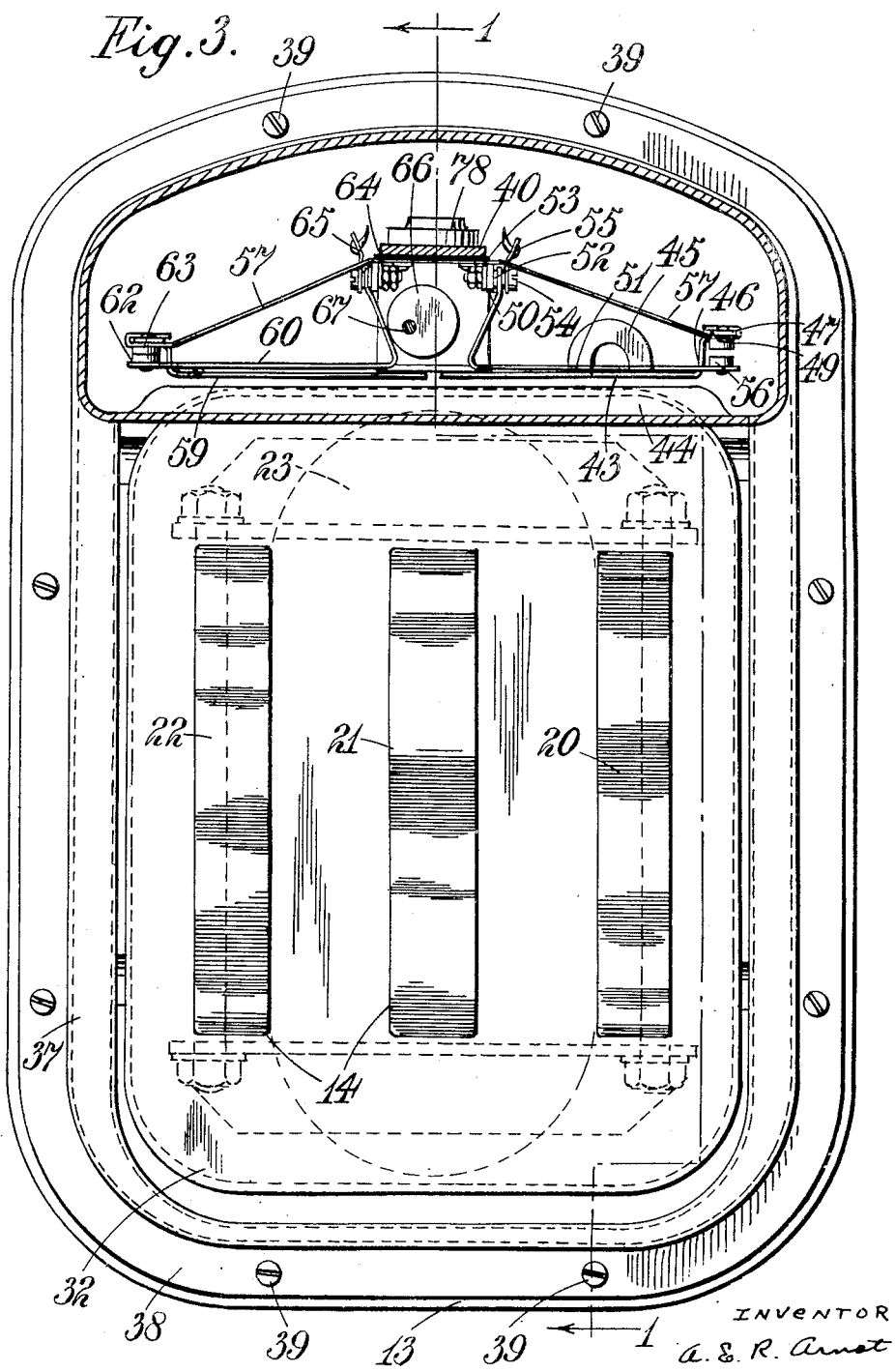

Feb. 14, 1950 A. E. R. ARNOT 2,497,753
ELECTRICAL COOKING AND LIKE APPLIANCES
Filed Aug. 5, 1947 5 Sheets-Sheet 4
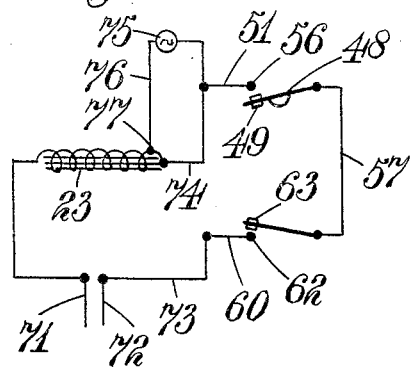

Feb. 14, 1950 — A. E. R. ARNOT — 2,497,753
ELECTRICAL COOKING AND LIKE APPLIANCES
Filed Aug. 5, 1947 — 5 Sheets-Sheet 5

INVENTOR
A. E. R. Arnot
By Watson, Cole, Grindle & Watson

Patented Feb. 14, 1950

2,497,753

UNITED STATES PATENT OFFICE 2,497,753

ELECTRICAL COOKING AND LIKE APPLIANCES

Alfred Erwin Reginald Arnot, London, England, assignor to J. E. Shay Limited, London, England, a British company Application August 5, 1947, Serial No. 766,237
In Great Britain June 13, 1946

Section 1, Public Law 690, August 8, 1946
Patent expires June 13, 1966

6 Claims. (Cl. 219—25)

This invention comprises improvements in or relating to electrical cooking and like appliances. Devices are known for heating cooking utensils, domestic irons and the like in which the heat is generated in the article to be heated by magnetic induction which produces eddy currents, instead of by direct resistance heating. In general in such devices a body of a metal which is magnetic such as iron is used and an alternating magnetic field is caused to pass through the magnetic body in the utensil to be heated by means of a laminated magnet which is wound with an exciting coil and is separate from the utensil in question. Thus the pan or kettle or electric iron or such like utensil when laid on the magnet will become heated, and the heating, being effected within the body of the utensil, is very efficient. The magnet, although it is the source of the alternating magnetic flux which effects the heating, being laminated, does not tend to heat itself to any substantial extent and waste of heat which is so common in electric hot plates is thus avoided while the connection of the utensils themselves to the electric circuit by means of flexible wires, which is common for example with electric kettles, is obviated. The present invention relates to apparatus of this type. The great disadvantage of apparatus of this type is that the electromagnet holds the utensil down firmly to itself by magnetic attraction and in order to permit it to be removed it is necessary first to switch off the current.

According to the present invention, in electric cooking, ironing or like appliances of the type referred to, an electric switch is provided in the circuit of the electromagnet, together with automatic operating means therefor, engaged by the utensil when it is laid in place, so as to switch the current on, and disengaged when it is lifted so as to switch the current off.

Preferably, the electromagnet is itself movably mounted and movement of the electromagnet and utensil is utilised for actuating the switch. Thus the first action of lifting the utensil will move it with the electromagnet sufficiently to operate the switch, the magnetic flux will thereby be discontinued and the continuation of the same movement by the user will lift the utensil clear. Alternatively there may be a switch-engaging portion of the utensil which is movable relatively to the remainder and is conveniently located close to the handle thereof so that the user will actuate the switch-engaging portion when the handle is grasped to lift the utensil.

A further feature of the invention relates to the employment of a thermostat and contact, in juxtaposition to the utensil, for cutting off or reducing or modifying the magnetic flux when the temperature reaches a predetermined limit.

Further features of the invention will appear from the following description of particular embodiments thereof which are given, by way of example, and are shown in the accompanying drawings in which—

Figure 7:
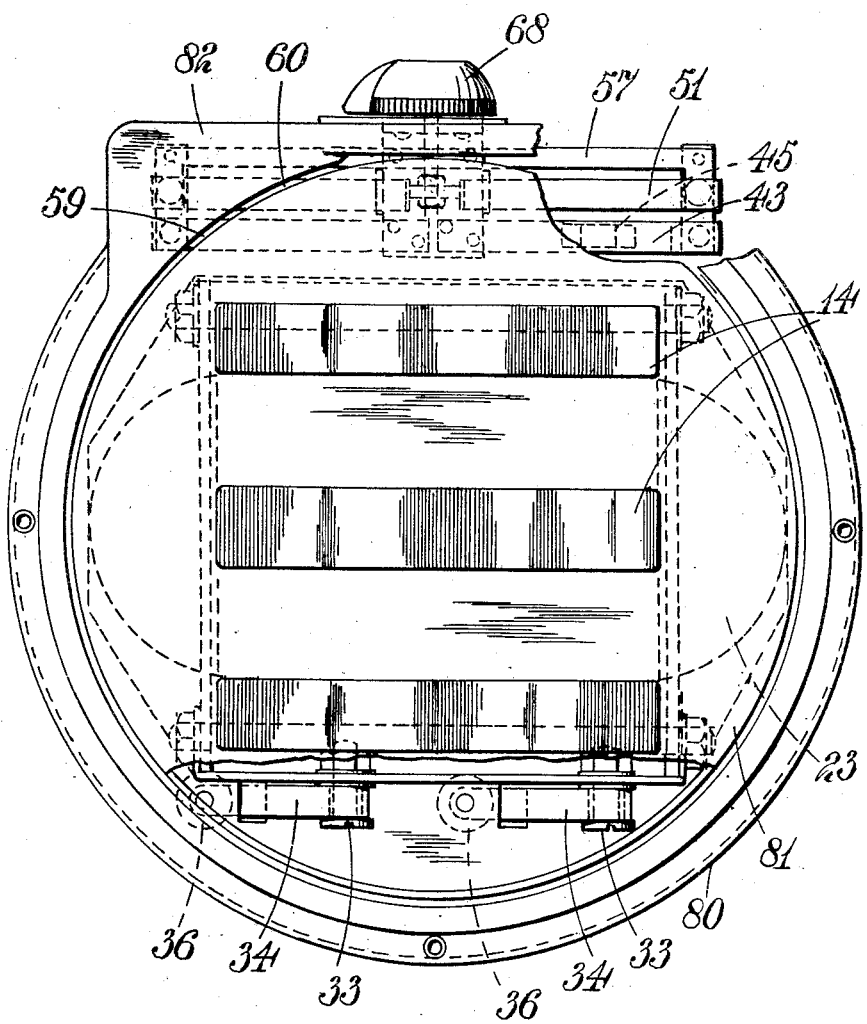

Figure 1 is a side elevation partly in section upon the line 1—1 of Figure 3 of an electric iron in accordance with the invention, Figure 2 is a vertical section upon the line 2—2 of Figure 1, Figure 3 is a plan partly in section upon the line 3—3 of Figure 1, Figure 4 is a detail of a magnet support, Figure 5 is a detail of switch mechanism, Figure 6 is a connection diagram, Figure 7 is a plan of a hot plate with certain parts broken away to show the internal construction, and Figure 8 is a diagram partly in vertical section of a further alternative.

Referring to Figures 1 to 3, a flat iron 11 having a handle 12 is provided, the main body of the iron being made of highly magnetic material and the handle, which is secured to it, being of a heat-insulating plastic. No electrical connections or internal apparatus are necessary in the iron for the purpose of heating it, all the heating being effected by magnetic induction. The iron is heated by placing it on a heating element comprising a base 13 which supports a magnet 14 and is provided at one end with a switch mechanism enclosed in a casing 15.

As can be seen from Figures 2 and 3, the magnet 14 consists of a large number of laminations each of which has a vertical central limb 16, two lateral limbs 17, 18, and a horizontal lower limb 19 which joins the limbs 16, 17 and 18 together. The upper edges of the limbs 16, 17, 18 of the laminations, laid side-by-side, provide horizontal upper pole-faces 20, 21 and 22, which are all in the same plane as one another and face upwardly so that the lower face of the iron 11 can rest upon them. In the spaces between the limbs of the magnet there is fitted an exciting coil 23 which may, if desired, be constituted by aluminium strip covered with an anodised oxide film for insulating purposes. Alternatively, it may be made of enamelled copper wire or even oxide-coated copper wire or strip. The laminations of the magnet 14 are held together by bolts 24 which extend between clamping plates 25, 26, and are secured by nuts 27, 28. The clamping plates, along their lower edges, are bent outwardly to form flanges 29, 30, and to the flanges there is secured a sheet metal casing 31 having upturned sides. A lid 32 to the casing is provided which fits the sides closely all round and is slotted to pass the poles 20, 21, 22 and enable them to project slightly above the surface of the lid 32, as best seen in Figure 2 of the drawing. This ensures that the iron 11 can rest in close contact with the poles of the magnet and will be kept clear of contact with the casing. From the sides of the casing there project outwardly, near the corners thereof, suspension screws 33, four in number, and each of the screws 33 is encircled by the bent upper end of a suspension spring 34. There are four of these suspension springs and their lower ends pass through apertures 35 in the base 13 (see Figure 4) and are secured to the underside of the base by nuts 36. The suspension springs 34 are strong enough to support the weight of the magnet 14 and the casing 31, but they yield and allow the magnet to be depressed when the iron 11 is placed upon it. Around the structure of the casing 31 and the suspension springs there is a fixed outer casing 37, the lower edge of which is flanged outwardly as shown at 38, and is secured to the base 13 by screws 39. At one end the base 13 extends beyond the magnet 14 sufficiently to clear the body of the iron 11 and here it supports a switch-casing 15 already referred to. Within the switch-casing is the switch mechanism shown in Figure 5 and also in plan in Figure 3. This comprises a bracket 40, which is secured to the underside of the top of the casing 15, and which has a horizontal lower arm 41 and an upturned end 42 which approaches closely to the wall of the casing 15 where it abuts against the back of the iron 11 when the latter is in position on the heating unit. To the front of the upturned portion 42 of the bracket 40 there is secured a horizontally-extending spring arm 43. The casing 15 has a thin wall 44, which as can be seen in Figure 3, is bulged inwardly to form a recess into which the back of the iron fits and the spring arm 43 lies close behind the wall 44. The material of the casing 15 is brass or some other non-magnetic metal and the spring carries a horseshoe permanent magnet 45 so that when the iron 11 is put in place on the magnet poles 20, 21, 22, with its rear end close to the wall 44, the attraction between the iron and the magnet 45 will draw the spring 43 forwardly as far as the wall 44 will allow. The spring 43 at its upper end is bent rearwardly, as shown at 46, and is riveted to an insulating block 47. The insulating block 47 supports a contact strip 48 which carries a contact 49.

The bracket 40 has a forwardly-projecting lug 50 on which is secured one end of a spring contact arm 51. The arm 51 is insulated from the bracket 40 by washers 52, 53, (Figure 3) and is secured in place by a screw 54 which also clamps in position a terminal lug 55. The spring contact arm 51 is bent outwardly parallel with the arm 43 and carries at its outer end a contact 56 to cooperate with the contact 49 already referred to. The spring arm 43, when attracted forward by the action of the magnet 45 on the iron 11, draws the contacts 49, 56, together and causes them to complete a circuit which extends from the contact 49, through the strip 48, and thence by a continuation of the strip 48 along strip 57 to the other side of the switch member. The strip 57 is supported by, but insulated from, the bracket 40. On the other side of the bracket the strip 57 reaches an insulating block 58 similar to the block 47, hereinbefore described, and this block 58 is supported on an arm 59 extending from the upturned portion 42 of bracket 40, similarly to the arm 43 already described. A second spring contact arm 60, similar to the arm 51, and similarly supported, extends above the arm 59 and carries at its outer end a contact 62 to engage a contact 63 which is connected to the strip 57. The contact arm 60 is insulated from but supported by a lug 64 on the bracket 40, similar to the lug 50 previously described and a terminal lug 65 is provided connected to the end of the arm 60.

The spring arm 59, although it is externally similar to the spring arm 43, differs from it in that it is made of a bi-metallic strip which, when it becomes heated, tends to urge the contact 63 rearwardly out of engagement with the contact 62. The contact 62, mounted on the spring arm 60, is however, urged towards the contact 63 by an eccentric 66 on a vertical spindle 67 which passes through the top of the lug 49 and through the casing 15 and carries, above the casing, an adjusting knob 68. The knob 68 carries a pointer 69 and an appropriate scale may be provided on the outside of the casing 15 so that the setting of the eccentric 66 can be determined by the operator. In accordance with the setting of this eccentric the bi-metallic strip 59 will have to be either hotter or cooler before it will cause the contacts 62, 63, to disengage.

The electrical connections are shown in Figure 6, and as will be seen the supply from lines 71, 72 passes, by way of line 73, through the switch contact arm 60, contacts 62, 63, flexible strip 57, member 48, contacts 49, 56, and arm 51 to line 74, which is connected to the electromagnet coil 23 and thence back to the other supply line 71. A lamp 75 is connected from the arm 51, by way of a line 76, to a tapping 77 on the magnet winding 23. Conveniently, the lamp 75 is mounted in a socket 78 mounted on the bracket 40 and a rear window 79 on the casing 15 allows it to be seen when the current is "on." If, for any reason, the placing of the iron in situ fails to operate the switch mechanism, the lamp 75 will not light and thus warning will be given to the operator. Ordinarily the switch will operate as long as the iron is placed close enough to the wall 44 of the casing 15 and the recessed form of this wall assists the operator in placing the iron correctly, but if the lamp does not light a very slight adjustment of the position of the iron will ordinarily ensure correct operation. When the iron is hot enough the lamp goes out. The operator, seeing this, knows that it is ready to be lifted away and as soon as lifting effort is applied to the iron the magnet rises on the spring arms 34 and this movement would be sufficient to carry the iron forward out of the range of the horseshoe magnet 45, causing the circuit to be broken at the contacts 49, 56. Thus, even if the thermostat is not cut off from the iron already automatically at the contacts 62, 63, the circuit will be broken at the contacts 49, 56, and the iron will easily be lifted away. No current will be used until the iron is returned to place and no current will be wasted once the iron is hot. The magnet induces the heat within the body of the iron itself and does not itself become quickly heated. The apparatus is therefore exceptionally economical in current.

Referring to Figure 7, this shows the application of the same general construction to an electric hot-plate for heating a kettle, saucepan, or the like. The magnet 14 is the same as already described and has an exciting coil 23 as before. This is located on a circular base 80 and in a movable casing 81 supported on springs similar to the springs 34, already described. An automatic switch mechanism, which may be identical with the switch mechanism shown in Figure 5, is located beneath the hot plate in a lateral projection 82 on the base plate. This switch comprises a spring arm 43 which carries a magnet 45, and a contact arm 51 connected by a flexible strip 57 to a second contact arm 60 operated by a knob 68, all as already described. These parts, being located on their side beneath the surface of the casing 81, are actuated magnetically by the bottom of a kettle or pan which is laid on the hot plate and are also controlled by the heat of the pan or kettle exactly like the iron previously referred to, and the operation of cutting off the current when the utensil is lifted is the same as before. The parts do not, therefore, need further detailed description.

Figure 8 shows a construction diagrammatically in which a kettle 90 rests on a base 91 containing an electromagnet 14, as already described. The handle 92 of the kettle has pivoted to it a lever 93 which lies close beneath the handle and is urged downwardly by a spring 94. The lever extends to the back of the kettle behind the handle 92 where it is forked to engage a vertical sliding rod 95 having a presser foot 96 at its lower end which is approximately level with the bottom of the kettle 90. The base 91 has a plunger 97 to operate a switch arm 98 by which current may be turned on or off to the electromagnet 14. When the kettle is left in place, as shown in the drawing, the switch arm 98 is kept depressed and the current is on. When the operator wishes to remove the kettle he grasps the handle 92 and with it the lever 93, thereby lifting the lever and the sliding rod 95 and with it the presser foot 96. This allows the plunger 97 to rise and switch off the current, whereupon the kettle can readily be lifted from the hot plate. With this construction it is unnecessary that the magnet 14 should be movably mounted. The kettle 90 is centered on the base 91 by an upwardly-projecting flange 99 thereon which surrounds the bottom of the kettle.

Instead of using a thermostat for regulating the temperature as above described, temperature control may be effected by providing a regulating switch having tappings to various points on the winding.

If any noise is found to arise from the periodic variation of magnetic pull during the alternations of the electric current supply, this can be obviated by letting into the electromagnet pole-face shading rings which have for effect to delay the passage of the flux through the portion so shaded and thus to ensure that magnetic attraction reaches its maximum on different parts of the pole-face at different times.

If desired the electromagnet may be embedded in a body of a heat-resisting filler, for example a mouldable plastic. For example the casing 81, Figure 7, may be filled with a heat-resisting plastic. In this case the cover of the casing may be omitted if desired. The effect of the filler is to exclude moisture in the event of liquid being spilt on the hot plate or the like.

In order to get a snap-action of the contacts, for example of contacts 62—63, it is preferable for these contacts to consist of small pads of magnetised material so that they tend to stick together. When they part they will then do so suddenly. The same can be done with contacts 49—56 if desired.

It is also possible, in connection with apparatus such as is shown in Figure 8, instead of having a single plunger such as the plunger 97, to have a number of plungers located around the periphery of the kettle 90 each of which operates a switch, the switches being connected in series with one another. In this case unless either the presser foot 96 or a portion of the kettle 90 overlies the plungers so employed, the current will not go on. Thus accidental switching on of the current by laying a small object on the hot plate will not occur and the plate will only come into use if a large utensil is placed there.

I claim:

1. In an electrically heated appliance of the type referred to the combination of a base, an electromagnet with upwardly-facing poles movably mounted on the base, means for yieldingly urging the electromagnet upwards through a limited path, a switch in series with the exciting coil of the electromagnet, a utensil to be heated which is heavy enough to depress the magnet when placed thereon, and switch-operating means having an actuating part which co-operates with the electromagnet and utensil when the latter is in place, to break the magnet circuit upon lifting of the utensil, while the magnet follows the utensil through said limited path.

2. An appliance as claimed in claim 1 wherein the actuating part of the switch operating means consists of a magnetic member mounted to be movable automatically by attraction when the utensil is brought close to it on being laid on the electromagnet.

3. An appliance as claimed in claim 2 wherein the magnetic member of the switch operating means is located to one side of and above the level of the pole faces of the electromagnet so as to face one of the sides of the utensil and the magnet mounting is such as to cause it to move upwardly in an inclined path leading away from said magnetic member to carry the utensil out of the effective magnetic field of the magnetic member.

4. An appliance as claimed in claim 3 wherein the electromagnet is mounted on inclined flat springs disposed substantially parallel with one another to afford said inclined path of movement.

5. An appliance as claimed in claim 4 wherein the switch operating means comprises two spring-arms, each operatively connected to a pair of electric switch contacts, one spring-arm taking the form of a bi-metallic strip positioned adjacent the utensil when the latter is in place on the electro-magnet, so as to be influenced by changes in temperature of the utensil and operate one pair of contacts thermostatically, and the other spring-arm carrying the aforesaid magnetic member and being moved thereby to close the other pair of contacts when the utensil is placed on the electro-magnet, and to open them when the utensil is removed, the two pairs of contacts being arranged in series with one another and with the electro-magnet.

6. An appliance as claimed in claim 1 wherein the switch operating means comprises two spring-arms, each operatively connected to a pair of electric switch contacts, one spring-arm taking the form of a bi-metallic strip positioned adjacent the utensil when the latter is in place on the electro-magnet, so as to be influenced by changes in temperature of the utensil and operate one pair of contacts thermostatically, and the other spring-arm carrying the aforesaid actuating part and being moved thereby to close the other pair of contacts when the utensil is placed on the electro-magnet, and to open them when the utensil is removed, the two pairs of contacts being arranged in series with one another and with the electro-magnet.

ALFRED ERWIN REGINALD ARNOT.

REFERENCES CITED

The following references are of record in the file of this patent:

UNITED STATES PATENTS

| Number | Name | Date |
|---|---|---|
| 1,951,409 | Havenner et al. | Mar. 20, 1934 |
| 2,288,510 | Brannon | June 30, 1942 |
| 2,374,662 | Black | May 1, 1945 |
| 2,415,688 | Hall, Jr. | Feb. 11, 1947 |

FOREIGN PATENTS

| Number | Country | Date |
|---|---|---|
| 685,417 | France | July 10, 1930 |